United States Patent [19]

Cunningham

[11] 4,416,468
[45] Nov. 22, 1983

[54] PASSIVE SAFETY BELT SYSTEMS

[75] Inventor: Douglas J. Cunningham, Lutterworth, England

[73] Assignee: Britax (Wingard) Limited, United Kingdom

[21] Appl. No.: 256,477

[22] Filed: Apr. 22, 1981

[30] Foreign Application Priority Data

Apr. 30, 1980 [GB] United Kingdom ............... 8014199

[51] Int. Cl.³ .............................................. B60P 7/04
[52] U.S. Cl. .................................. 280/802; 297/469
[58] Field of Search .................... 280/803, 804, 802; 297/469, 473

[56] References Cited

U.S. PATENT DOCUMENTS

| | | | |
|---|---|---|---|
| 3,840,249 | 10/1974 | Strom | 280/802 |
| 4,084,841 | 4/1978 | Hayashi | 280/802 |
| 4,190,267 | 2/1980 | Stephenson | 280/803 |
| 4,203,618 | 5/1980 | Frank | 280/804 |
| 4,213,637 | 7/1980 | Mauron | 280/802 |
| 4,317,584 | 3/1982 | Takata | 280/804 |
| 4,323,267 | 4/1982 | Takada | 280/803 |
| 4,324,410 | 4/1982 | Stephenson | 280/802 |

Primary Examiner—Douglas C. Butler
Assistant Examiner—John A. Carroll
Attorney, Agent, or Firm—Hayes, Davis & Soloway

[57] ABSTRACT

A three point safety belt system has its lap and diagonal elements 14 and 16 fastened to anchorage points 22 and 24 at the bottom and top rear corners of an adjacent vehicle door 26. The common element 20 is lead through a loop 37 in the end of an arm 30 which is pivotally mounted at 34. As the car door opens the resulting tension in the belt causes the arm 30 to pivot upwardly and forwardly, lifting the belt away from the body of the seat occupant.

5 Claims, 7 Drawing Figures

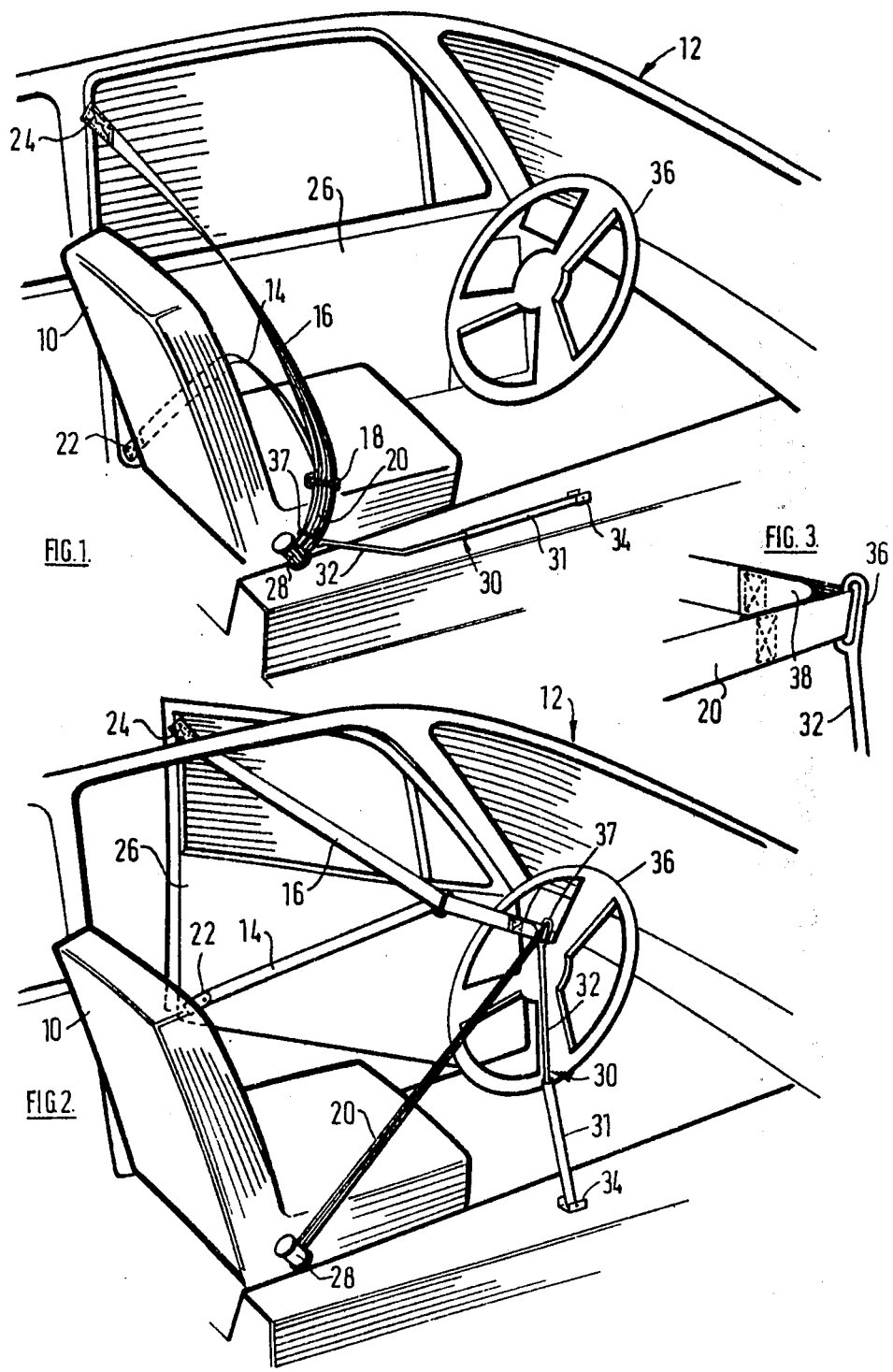

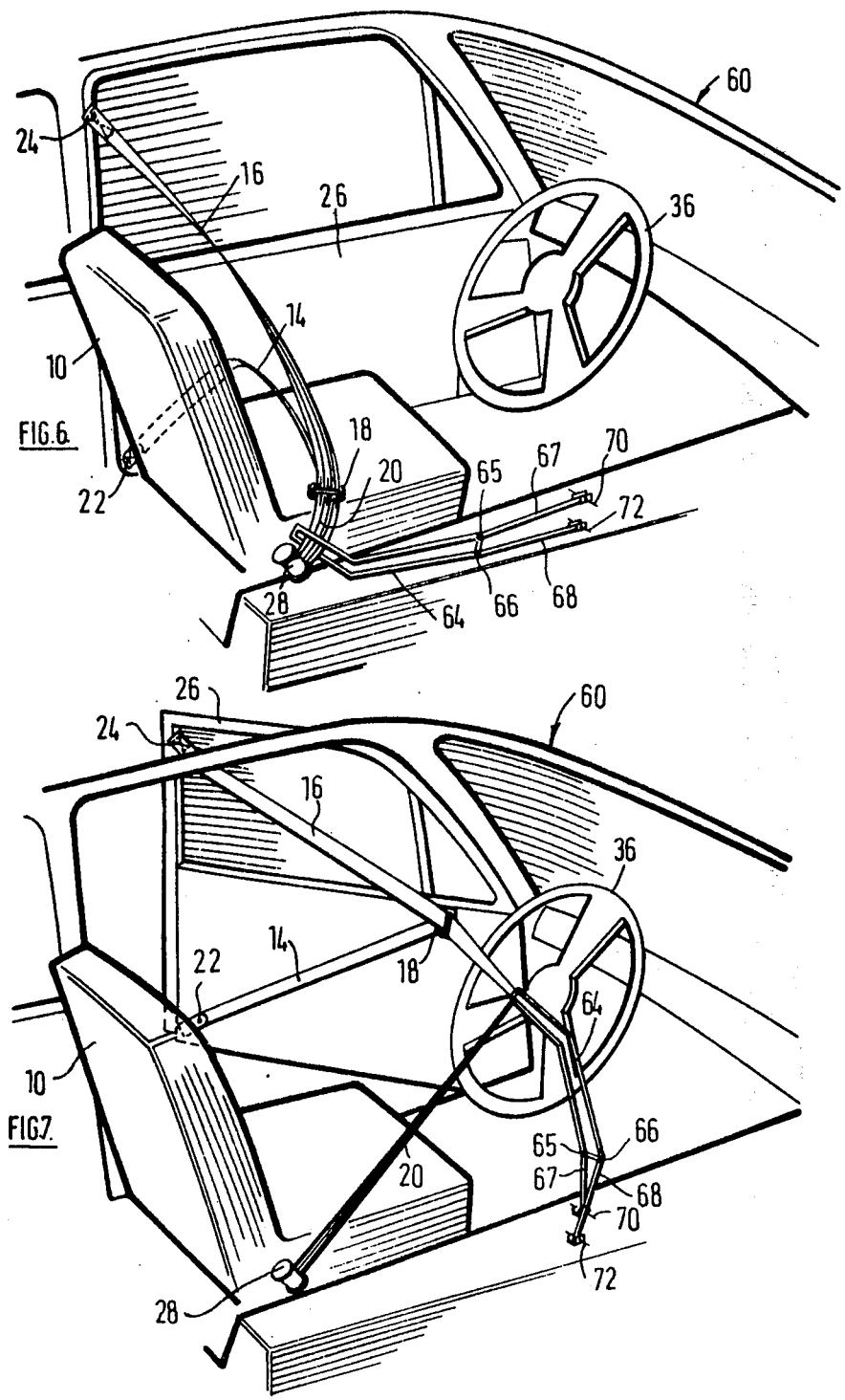

PASSIVE SAFETY BELT SYSTEMS

This invention relates to a passive safety belt system for a motor vehicle of the type in which the belt is moved away from the body of the user when the corresponding vehicle door is opened.

It is an object of the present invention to provide a system of the foregoing type in which the power used to move the safety belt is derived from the opening and closing movement of the vehicle door.

According to the invention, a passive safety belt for a motor vehicle seat located adjacent to a front-hinged door comprises a shoulder strap, a lap strap and a common strap interconnected to form a three-point safety belt, the free ends of the shoulder and lap straps being connected to the rear edge of said door in proximity to the top and bottom corners thereof and the free end of the common strap being guided, at a location inboard of and adjacent to the bottom of the back of the seat, on to an inertia reel, the system further comprising a rigid arm pivotally mounted adjacent to the front inboard corner of the bottom of the seat for angular movement about an axis of which the inboard end is above and in front of the outboard end so that the free end of the arm is movable between a first position adjacent to the location at which the common strap is guided on to the inertia reel and a second position in front of and spaced from the chest of the occupant of the seat, and means for coupling the free end of the arm to the safety belt so that, as the door is opened, the belt moves the arm from the first position to the second position and the belt is moved forwardly away from the occupant.

In one form of the invention, the belt is capable of limited movement relative to the end of the arm.

The arm may be formed in two sections which are freely axially movable relative to one another so as to vary the overall length of the arm.

Alternatively, the arm may be formed in two sections with the outer section being pivotably and slidably mounted on the outer end of the inner section so that the angle between the two sections and the length by which the outer section projects beyond the inner, are both variable. In addition, a link may be pivotally connected between the inner end of the outer section and a point spaced from the outer end of the inner section so that the length by which the outer section projects is dependant on the angle between the two sections.

In another form of the invention, a second arm is pivotally mounted for movement about an axis adjacent but not parallel to the pivot axis of the first arm, the free ends of the two arms being pivotally connected at respective points to a guide member along which and through which the belt is slidable, the angle between the two axes and the spacing between the two points of pivotal connection to the track relative to that between the two axes, being such that, as the door opens, the belt moves the guide member from a position in which it lies substantially parallel to the inboard edge of the seat with one end adjacent to the location at which the common strap is guided on to the inertia reel, to a position in which it extends transversely in front of the occupant of the seat.

An embodiment of the invention will now be described, by way of example, with reference to the accompanying drawings, in which:

FIGS. 1 and 2 are perspective views of the interior of a motor car in accordance with a first embodiment of the invention, with the door adjacent to the seat provided with the safety belt closed and open respectively;

FIG. 3 is a fragmentary perspective view, on an enlarged scale, of part of the safety belt shown in FIG. 2;

Figure 4:
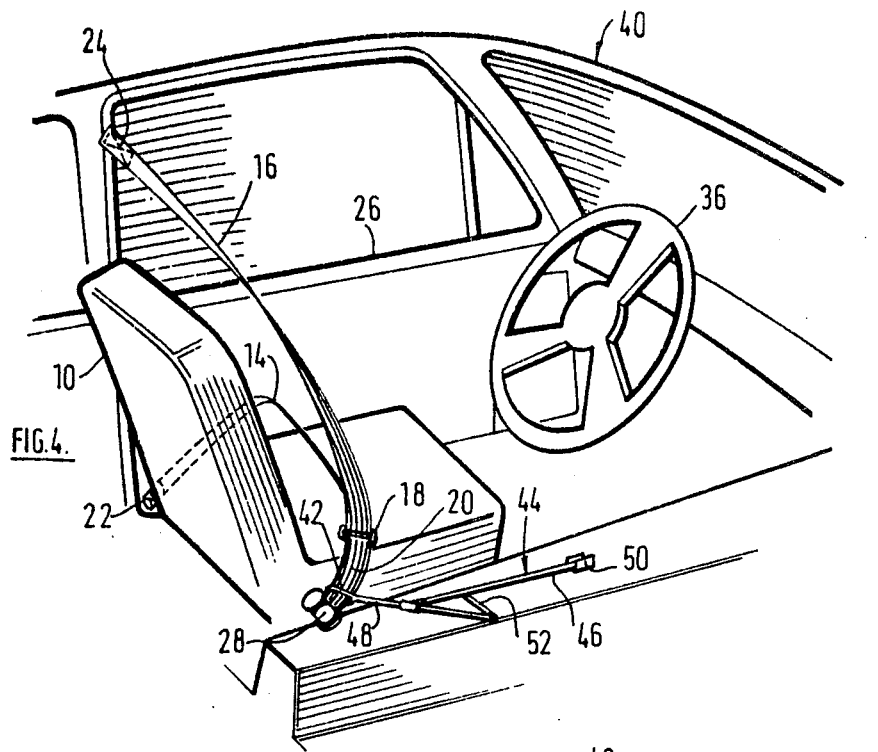
Figure 5:
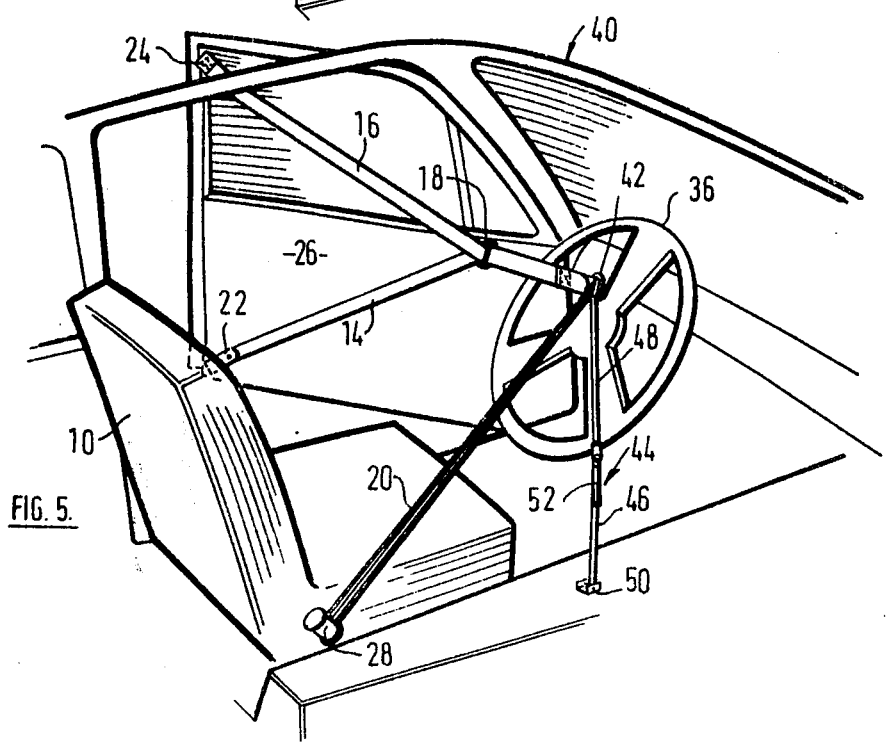

FIGS. 4 and 5 are perspective views, corresponding to FIGS. 1 and 2, of a second embodiment of the invention; and FIGS. 6 and 7 are perspective views, corresponding to FIGS. 1 and 2 of the third embodiment of the invention.

FIGS. 1 and 2 show the driver's seat 10 of a motor car 12 in accordance with the invention. A safety belt for the driver consists of a single length of webbing, forming the lap element 14 and the diagonal element 16 which runs freely through a flattened ring 18 connected to one end of another length of webbing forming the common element 20 of the safety belt. The free ends of the lap and diagonal elements 14 and 16 are connected to respective anchorages 22 and 24 near the bottom and top rear corners of the adjacent door 26 of the car. The free end of the common element 20 is connected to an inertia reel 28 mounted on the floor of the car on the inboard side of the seat 10 and adjacent to the back thereof.

In accordance with the invention, an arm 30, formed in two mutually telescopic sections 31 and 32, is pivotally mounted on the floor of the vehicle for angular movement about a pivot axis 34 located directly in front of the reel 28. The axis 34 slopes outwardly, rearwardly and downwardly and is oriented so that the arm 30 can move between the position shown in FIG. 1, in which it lies along the floor of the vehicle, to the position shown in FIG. 2 in which it abuts against the steering wheel 36. The free end of the outer telescopic section 32 carries a flattened ring 37 through which the common element 20 of the safety belt is threaded. An additional loop of webbing 38 (FIG. 3) is stitched to one side of the common element 20 and passes outside the ring 37 so as to limit the relative movement between the safety belt element 20 and the arm 30.

In use, when the door 26 is shut, the safety belt comprising the elements 14, 16 and 20, is in a configuration to be used by the driver of the car 12. When the door 26 is opened, the resulting pull on the lap and diagonal elements 14 and 16, particularly the latter, causes webbing to be drawn off the reel 28. The common element 20 slides through the ring 37 until the end of the loop 38 is reached. Further opening movement of the door results in the arm 30, being pivoted forwards and upwards until, when the door 26 is fully open, the arm 30 is in the position shown in FIG. 2 and the safety belt is held away from the body of the driver who can then leave his seat without obstruction. When the door 26 is closed, the foregoing procedure is reversed.

As the arm 30 moves from its position shown in FIG. 1 to its position shown in FIG. 2, the telescopic sections 31 and 32 thereof close up so that the arm reaches a minimum length as it passes the body of the driver. Subsequent movement causes the length of the arm 30 to increase until, when in the position shown in FIG. 2, the projecting length of the section 32 is about twice the corresponding projection length when the arm is in the position shown in FIG. 1. In some types of vehicle, it may be feasible to replace the telescopic arm with an inextendable rigid arm but a telescopic arm will usually be necessary in order to achieve a compromise between the required clearance as the arm moves past the driver's body between its two end positions and maximise the extent to which the safety belt is held away from the driver's body when the door 26 is fully open.

FIGS. 4 and 5 show another motor car fitted with a three-point safety belt similar to that of the car 12 shown in FIGS. 1 and 2. Equivalent parts are denoted by the same reference numerals and will not be described again in detail.

In the embodiment shown in FIGS. 4 and 5, the common element 20 of the safety belt passes through a flattened ring 42 on the end of an arm 44 which is formed in two sections 46 and 48. One end of the section 46 is pivotally mounted for angular movement about an axis 50 located and oriented similarly to the axis 34 (FIGS. 1 and 2). The outer end of the section 46 carries a pivotally mounted tubular element (not shown in detail) in which the section 48 is slidable. The end of the section 48 opposite to that carrying the ring 42 is coupled by a pivotal link 52 to an intermediate point on the section 46. The result of this arrangement is that variation of the angle between the two sections 48 and 46 causes a corresponding variation in the extent to which the end of the arm 48 carrying the ring 42 projects beyond the end of the arm 46.

As with the embodiment shown in FIGS. 1 and 2, a loop of webbing is provided to limit movement of the common element 20 of the safety belt through the ring 42. As the car door 26 opens, the arm 44 pivots from the position shown in FIG. 3 towards the position shown in FIG. 4, lifting the safety belt away from the body of the driver.

In some circumstances, it may be preferable to omit the link 52 so that the angle between the sections 46 and 48 of the arm 44 does not control the overall effective length of the arm 44. In this case, it is necessary to provide stops on the section 48 to limit sliding movement relative to the end of the section 44.

FIGS. 6 and 7 show a motor vehicle 60 fitted with yet another embodiment of the invention. Once again, the driver's seat 10 is provided with a safety belt similar to that illustrated in FIGS. 1 and 2. Equivalent parts are denoted by the same reference numerals and will not be described again in detail.

In FIGS. 6 and 7, the common element 20 of the safety belt passes through a rigid cranked elongate loop 64, comprising first and second sections at an angle to one another. The loop 64 is pivotally mounted, by means of universal joints 65 and 66 connected to its first section, on the ends of two arms 67 and 68 which are pivotally mounted for angular movement about respective axes 70 and 72 which are located in approximately the same position as the axis 34 (FIGS. 1 and 2). Although both axes 70 and 72 are inclined outwardly, backwardly and downwardly, they are not parallel to one another and the distance between the points at which they support their respective arms 67 and 68 differs from the distance between the universal joints 65 and 66 connecting the arms 67 and 68 to the loop 64. The precise configuration is chosen to be such that, as the arms 67 and 68 pivot upwardly and forwardly, the loop 64 moves from a position in which the first of its two cranked sections is substantially parallel to the floor of the car to a position in which it is substantially parallel to and abutting the steering wheel 36. As before, this pivotal movement is caused by the pull on the safety belt as the door 26 is opened. The common element 20 slides from one end of the loop 64 to the other in the course of this movement. A webbing loop, similar to the loop 38 (FIG. 3), is attached to the common element 20 to limit movement thereof through the ring 62.

With each of the embodiments of the invention, it will be customary to equip the front passenger seat of the car with an equivalent safety belt system. It will be appreciated that the geometry of the system for the front passenger is less critical as there is no steering wheel to avoid.

I claim:

1. A passive safety belt system in combination with a vehicle body having a front-hinged door and a seat located adjacent to said door, the system comprising:
   a shoulder strap, a lap strap and a common strap interconnected to form a three point safety belt, the free ends of the shoulder and lap straps being connected to the rear end of the door in proximity to the top and bottom corners thereof and the free end of the common strap being guided, at a location inboard of and adjacent to the bottom of the back of the seat, on to an inertia reel;
   a rigid arm formed in two relatively movable sections and pivotally mounted for angular movement about a pivot axis adjacent to the front inboard corner of the bottom of the seat so that the free end of the arm is movable between a first position adjacent to the location at which the common strap is guided on to the inertia reel and a second position in front of and spaced from the chest of the occupant of the seat; and
   means for coupling the free end of the arm to the safety belt;
   the inboard end of the pivot axis, relative to the vehicle body, being above and in front of the outboard end thereof, so that, as the door is opened, the belt moves the arm from the first position to the second position and the belt is moved forwardly away from the occupant.

2. A safety belt system according to claim 1, wherein the arm is formed in two sections which are axially movable relative to one another.

3. A safety belt system according to claim 1, wherein the arm is formed in two sections with the outer section pivotally and slidably mounted on the outer end of the inner section so that the angle between the two sections and the length by which the outer section projects beyond the inner section are both variable.

4. A safety belt system according to claim 3, further comprising a link pivotally connected between the inner end of the outer section and a point spaced from the outer end of the inner section so that the length by which the outer section projects is dependant on the angle between the two sections.

5. A passive safety belt system in combination with a vehicle body having a front-hinged door and a seat located adjacent to said door, the system comprising:
   a shoulder strap, a lap strap and a common strap interconnected to form a three point safety belt, the free ends of the shoulder and lap straps being connected to the rear edge of the door in proximity to the top and bottom corners thereof and the free end of the common strap being guided, at a location inboard of and adjacent to the bottom of the back of the seat, on to an inertia reel;
   a first rigid arm pivotally mounted for angular movement about a pivot axis adjacent to the front inboard corner of the bottom of the seat;

a second rigid arm pivotally mounted for angular movement about a pivot axis adjacent and at an angle with respect to the pivot axis of the first arm;

a guide member pivotally connected at respective points to the free ends of the two arms; and coupling means slidable along the guide member and connected to the safety belt;

the inboard end of each of the pivot axes, relative to the vehicle body, being above and in front of the outboard end thereof and the angle between the two axes and the spacing between the two points of pivotal connection to the track relative to the spacing between said two axes being such that, as the door opens, the belt moves the guide member from a position in which it lies substantially parallel to the inboard edge of the seat with one end adjacent to the location at which the common strap is guided on to the inertia reel, to a position in which it extends transversely in front of the occupant of the seat.

* * * * *